US010951045B2

(12) United States Patent
Bussing et al.

(10) Patent No.: US 10,951,045 B2
(45) Date of Patent: Mar. 16, 2021

(54) CIRCUITS AND METHODS FOR CURRENT DRAIN OF A BATTERY FOR WIRELESS SENSOR DATA TRANSMISSION

(71) Applicant: WISETECH GLOBAL LIMITED, Alexandria (AU)

(72) Inventors: Mathew Bussing, Alexandria (AU); Ryan Shaw, Alexandria (AU)

(73) Assignee: WISETECH GLOBAL LIMITED, Alexandria (AU)

( * ) Notice: Subject to any disclaimer, the term of this patent is extended or adjusted under 35 U.S.C. 154(b) by 232 days.

(21) Appl. No.: 15/747,082

(22) PCT Filed: Jul. 22, 2016

(86) PCT No.: PCT/AU2016/050657
§ 371 (c)(1),
(2) Date: Jan. 23, 2018

(87) PCT Pub. No.: WO2017/015705
PCT Pub. Date: Feb. 2, 2017

(65) Prior Publication Data
US 2018/0375350 A1    Dec. 27, 2018

(30) Foreign Application Priority Data

Jul. 24, 2015  (AU) ................................ 2015205956

(51) Int. Cl.
*H02J 7/00*   (2006.01)
*H02J 7/14*   (2006.01)
(Continued)

(52) U.S. Cl.
CPC ........... *H02J 7/0029* (2013.01); *H01M 10/46* (2013.01); *H01M 10/48* (2013.01); *H04B 1/04* (2013.01);
(Continued)

(58) Field of Classification Search
USPC ......................................................... 320/162
See application file for complete search history.

(56) References Cited

U.S. PATENT DOCUMENTS 6,856,654 B1 * 2/2005 Carkner ............... H04B 15/005
375/295
7,464,587 B2  12/2008 Schulze et al.
(Continued)

FOREIGN PATENT DOCUMENTS

EP     1705846 A2    9/2006
EP     2395594 A1   12/2011
(Continued)

OTHER PUBLICATIONS

PCT International Search Report and Written Opinion, PCT/AU2016/050657, dated Sep. 12, 2016, 10 pages.
(Continued)

*Primary Examiner* — Alexis B Pacheco
(74) *Attorney, Agent, or Firm* — Fenwick & West LLP

(57) ABSTRACT

Disclosed is a circuit including a sensor, a battery and a reservoir capacitance, the sensor being configured to generate sensor data and the capacitance being provided by one or more discrete capacitors. A first circuit component is configured to drain current from the battery to the reservoir capacitor to store energy in the reservoir capacitor at a safe rate. The safe rate does not adversely affect the battery's life. A second circuit component is configured to generate a series of data packets including sensor data at particular time intervals. A third circuit component is configured to transmit the series of data packets with the stored energy of the reservoir capacitor so that the transmitting does not drain the reservoir capacitor of all stored energy.

22 Claims, 3 Drawing Sheets

(51) Int. Cl.
*H04Q 9/00* (2006.01)
*H01M 10/46* (2006.01)
*H01M 10/48* (2006.01)
*H04B 1/04* (2006.01)

(52) U.S. Cl.
CPC ......... *H04Q 9/00* (2013.01); *H04Q 2209/886* (2013.01)

(56) References Cited

U.S. PATENT DOCUMENTS

| | | | |
|---|---|---|---|
| 8,663,105 B2 | 3/2014 | Malaurie et al. | |
| 2001/0028571 A1* | 10/2001 | Hanada | H02J 7/342 363/50 |
| 2011/0295079 A1* | 12/2011 | Malaurie | A61B 5/0008 600/300 |
| 2012/0001593 A1* | 1/2012 | Di Guardo | H04L 27/10 320/108 |
| 2015/0008867 A1* | 1/2015 | Smychkovich | H02J 7/0071 320/107 |
| 2016/0028130 A1* | 1/2016 | Dvorkin | H01M 10/441 429/90 |
| 2016/0118817 A1* | 4/2016 | Uno | H01M 10/44 320/166 |

FOREIGN PATENT DOCUMENTS

FR 2 961 323 A1 12/2011
WO WO 2013/039545 A1 3/2013

OTHER PUBLICATIONS

Huang, K., et al., "An Ultra-Low-Power 9.8 GHz Crystal-Less UWB Transceiver With Digital Baseband Integrated in 0.18 μm BiCMOS," IEEE Journal of Solid-State Circuits, Dec. 12, 2013, vol. 48, No. 12, pp. 3178-3189.
European Patent Office, Extended European Search Report and Opinion, EP Patent Application No. 16829492.4, dated Mar. 6, 2019, five pages.

* cited by examiner

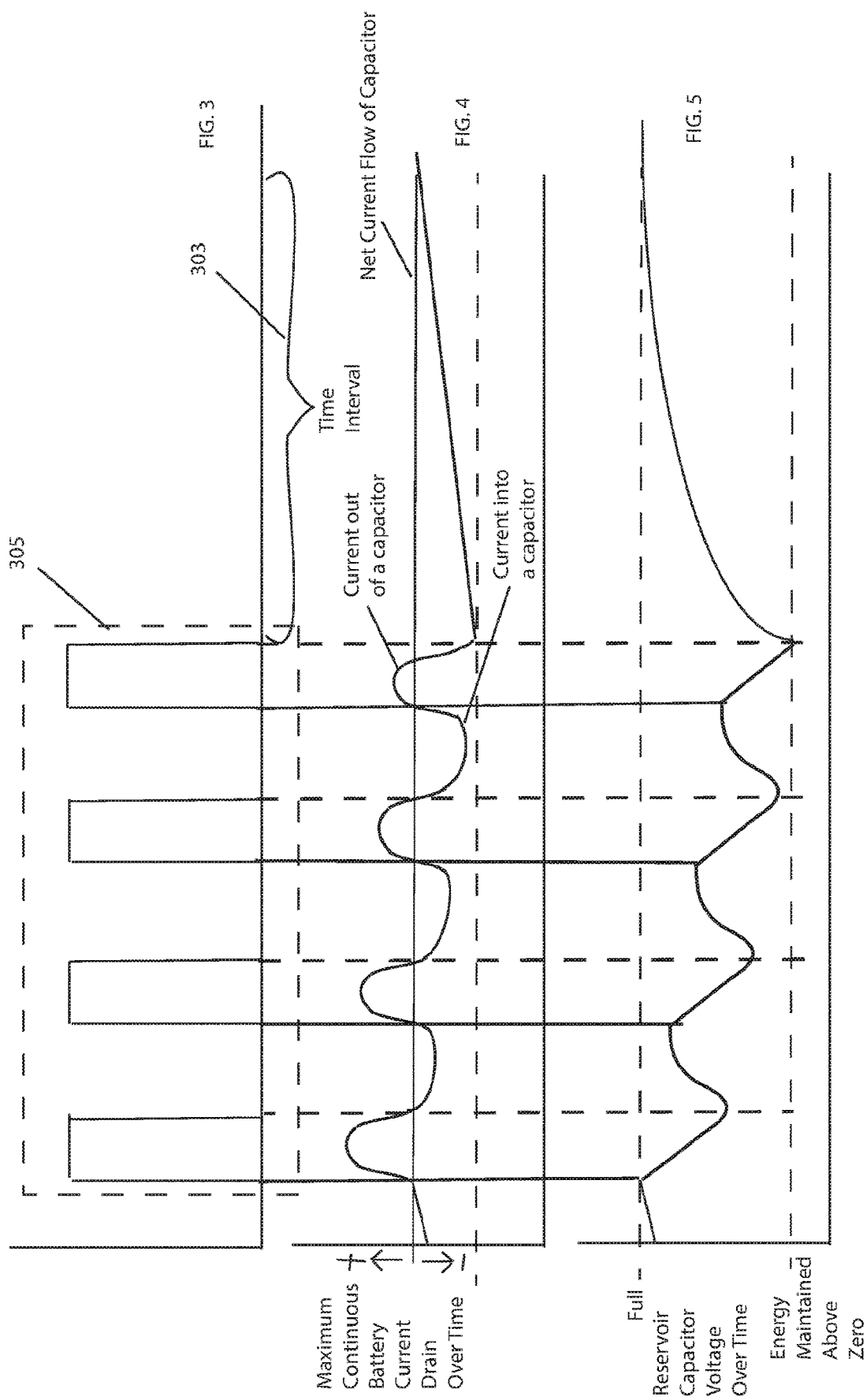

CIRCUITS AND METHODS FOR CURRENT DRAIN OF A BATTERY FOR WIRELESS SENSOR DATA TRANSMISSION

TECHNICAL FIELD

Disclosed are circuits and methods for current drain of a battery for wireless sensor data transmission.

BACKGROUND

There are many different types of sensors that collect sensor data. For example, there are tyre pressure sensors, light sensors, motion sensors, smoke sensors, heat sensors, to name a few. Sensors of different types utilise batteries for power so that they can be used remotely. That is, there may be a need for a sensor to be installed or used where it is not hardwired into an electrical system. In such a case, a sensor would most likely be battery powered.

In certain applications, a sensor circuit can include a wireless transmitter. The sensor data collected by the sensor therefore can be wirelessly transmitted so that a receiver can receive the sensor data. The sensor data can be used in various applications.

SUMMARY

In a sensor circuit that includes a transmitter for transmission of data via a signal, the transmission circuit can consume substantial energy available in a battery. Battery life is at least in part dependent on the magnitude of current drained from the battery over its life as well as the repetition of high current drain incidents. A longer battery life is desirable.

Disclosed is a circuit including a sensor, a battery and a reservoir capacitance, the sensor being configured to generate sensor data and the capacitance being provided by one or more discrete capacitors. A first circuit component is configured to drain current from the battery to the reservoir capacitor to store energy in the reservoir capacitor at a safe rate. The safe rate does not adversely affect the battery's life. A second circuit component is configured to generate a series of data packets including sensor data at particular time intervals. A third circuit component is configured to transmit the series of data packets with the stored energy of the reservoir capacitor so that the transmitting does not drain the reservoir capacitor of all stored energy.

In one embodiment, the time intervals between the series of data packets is at least substantially the same as the minimum amount of time required to recharge the reservoir capacitor after the reservoir capacitor has been partially depleted. In another embodiment, the number of data packets is limited to avoid depletion of the energy stored in the reservoir capacitor during the transmitting step. In another embodiment, the length of data packets is limited to avoid depletion of the energy stored in the reservoir capacitor during the transmitting step. The sensor can simultaneously drain current from the battery. In this way the magnitude of the current drained from the battery is always maintained below the maximum continuous current threshold of the battery which is a value associated with a particular battery. Passive current drain of a battery is within the maximum continuous current threshold. High current drain incidents are accordingly eliminated.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

BRIEF DESCRIPTION OF DRAWINGS

An example will now be described with reference to:

FIG. 3 depicts a single series of data packets;

FIG. 4 depicts a maximum continuous battery current drain over time in line with the series of data packets of FIG. 3; and FIG. 5 depicts the reservoir capacitance voltage over time in line with the series of data packets of FIG. 3.

DESCRIPTION OF EMBODIMENTS

Figure 1:
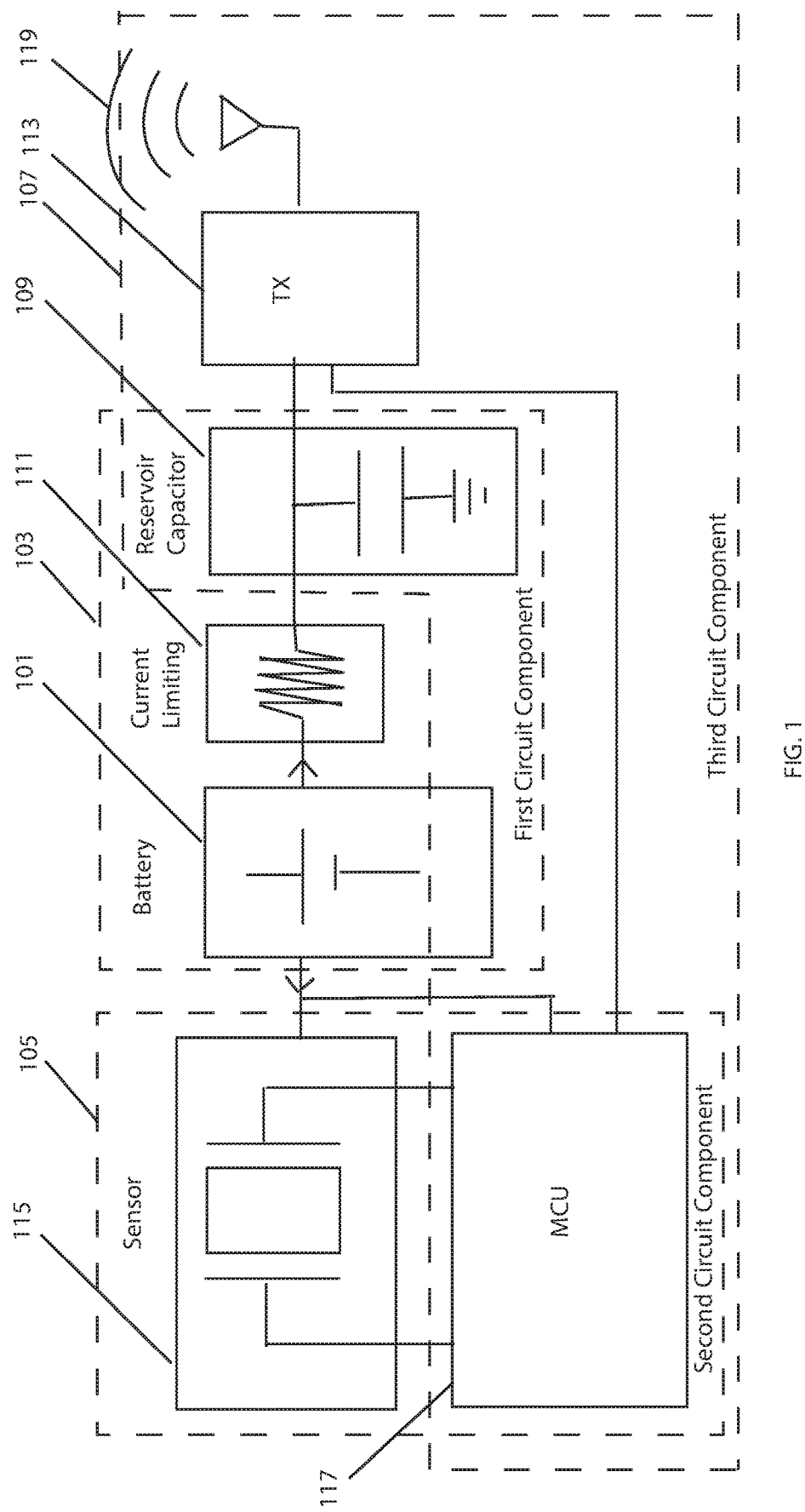
FIG. 1 depicts a sensor circuit including a battery.

FIG. 1 depicts a sensor circuit including a battery 101. The first circuit component 103 is configured to drain current from the battery to the reservoir capacitor to store energy in the reservoir capacitor. A second circuit component 105 is configured to generate a series of data packets including sensor data at particular time intervals. A third circuit component 107 is configured to transmit the series of data packets with the stored energy of the reservoir capacitor so that the transmitting does not drain the reservoir capacitor of all stored energy.

The first circuit component 103 includes a current limiting component 111 before the reservoir capacitor 100. The current limiting component 111 can keep the current from the battery 101 to the reservoir 109 at the passive drain level of the battery 111. In one embodiment, a battery 101 can be, for example, a 3V battery. For such a battery, the passive current drain is <=30 uA. A resistor as a passive current limiting component can have a value of >=50 K to maintain the current drain of the battery 101 below its continuous current drain level. Its continuous current drain level maybe a passive current drain level. Any current limiting component is within the scope of this discussion including, for example, active methods such as current limiting diodes. In this way the magnitude of the current drained from the battery is at the safe rate. The energy stored in the capacitor 109 is sufficient for the transmitter 113 to transmit a series of data packets including sensor data while maintaining some energy stored in the reservoir capacitor 109. Upon completion of a transmission of a series of data packets, some energy remains in the reservoir capacitor 109. That is, the transmitting step does not drain the reservoir capacitor 109 of all stored energy.

Any battery can be utilised as battery 101. The continuous current drain of the battery 101 can determine the selection of the capacity of the reservoir capacitor 109 and the current limiting component 111. For example, for data signals that can travel five meters, a 3 volt battery can continuously drain to a capacitor of 800 uF, so that at the end of a particular time interval of 30 seconds, a burst of four packets, each one taking 12 milliseconds can be transmitted. For the rest of the 30 second particular time interval the reservoir capacitor 109 is recharging.

The second circuit component 105 for generating a series of data packets including sensor data at particular time intervals includes a sensor 115 and a microcontroller 117. A sensor 115 can be any type of sensor, for example, tyre pressure sensors, light sensors, motion sensors, smoke sensors, heat sensors, and the like. It is understood that any type of sensor is within the scope of this discussion. The microcontroller 117 receives sensor data from the sensor 115 and can generate a series of data packets including sensor data at particular time intervals. The microcontroller 117 drives the transmitter 113 to transmit a signal 119 carrying the data packets. The step of transmitting can be repeated at particular time intervals which can be customized in the MCU. In one embodiment, the particular time intervals between transmissions of series of data packets can be selected so that the transmitting step does not drain the reservoir capacitor 109 of all stored energy.

The particular time intervals between the signals carrying the series of data packets are at least substantially the same as the minimum amount of time required to recharge the reservoir capacitor 109 at less than the continuous current capability of the battery. Since the battery drains at less than the continuous current drain rate, eliminated are high current drain incidents of signal transmission that can adversely affect the life of a battery. The life of a battery can be maximised by limiting the current drain to less than its maximum continuous current drain. In the example given above, the life of the battery in use can be ten years.

The sensor 115 and microcontroller 117 can simultaneously operate on current directly drained from the battery. The direct drain from the battery can be a passive drain. In this way, the functionality of the sensor and the microcontroller is provided without adversely affecting the life of the battery since they draw little current and can operate on passive current drain. In circuit combination of the continuous current drain to the reservoir capacitor 109 and the sensor 115 and microcontroller 117 operating in accordance with the maximum continuous current drain rating can advantageously avoid degradation of a battery and can provide for its long life.

Figure 2:
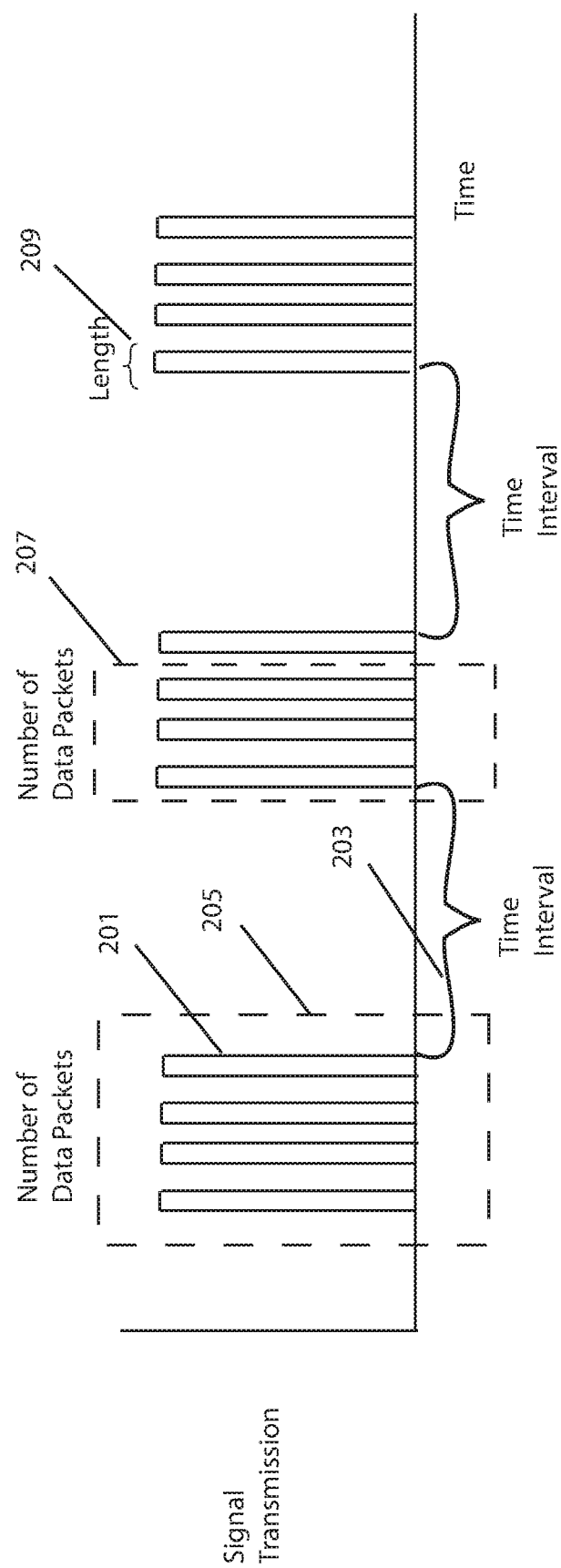
FIG. 2 depicts transmission of a plurality of series of data packets of sensor data generated by the microcontroller.

FIG. 2 depicts the signal transmission including data packets of sensor data generated by the microcontroller 117. FIGS. 3, 4 and 5 together represent features of the disclosed circuit and methods thereof in time. FIG. 3 depicts a single series of data packets. FIG. 4 depicts a maximum continuous battery current drain over time in line with the series of data packets of FIG. 3. FIG. 5 depicts the reservoir capacitance voltage over time in line with the series of data packets of FIG. 3.

As discussed above, the microcontroller 117 drives the transmitter 113 to transmit a signal 119 for carrying data packets of sensor data. Referring to FIG. 2 depicting signal transmission, signals including data packets are shown as four data packets transmitted over time at particular time intervals. The dotted lines 205 and 207 around four data packets and three data packets, respectively, are intended to illustrate that the number of data packets can be varied. For example, instead of transmitting a series of four data packets 205, a transmission of a series of three data packets 207 can be generated. The microcontroller 117 can provide for customisation of the number of data packets. The number of data packets generated can be selected so that the transmitting step does not drain the reservoir capacitor of all stored energy.

Still referring to FIG. 2, the length of a data packet can be customised at the microcontroller 117 so that the transmitting step does not drain the reservoir capacitor of all stored energy. For example, the length of a data packet may provide uninterrupted transmissions of two data packets in juxtaposed sequence. It is understood that the number and the length of the data packets can be adjusted independently or together in any suitable configuration so that the transmitting step does not drain the reservoir capacitor of all stored energy. By not completely draining the reservoir capacitor 109, there is ample energy available to transmit the intended data signals so as to avoid corruption of the data in the transmission.

FIG. 3 depicts a single series of data packets. FIG. 4 depicts a maximum continuous battery current drain over time in line with the series of data packets of FIG. 3. FIG. 5 depicts the reservoir capacitance voltage over time in line with the series of data packets of FIG. 3. As noted in by the horizontal lines dropping down from FIG. 3 through to FIGS. 4 and 5, the current out of the capacitor never causes the energy of the capacitor to be depleted as indicated at the end of the transmission of the data packet. As discussed above, energy can be maintained by adjusting the transmission, wherein the time intervals between the series of data packets is at least substantially the same as the minimum amount of time required to recharge the reservoir capacitor after the reservoir capacitor has been partially depleted and/or the number of data packets is limited to avoid depletion of the energy stored in the reservoir capacitor during the transmitting step and/or where the length of one or more a data packets is limited to avoid depletion of the energy stored in the reservoir capacitor during the transmitting step. As depicted in FIGS. 3, 4 and 5, current flows to the capacitor between data packet transmissions and directly after data packet transmissions so does not drain the reservoir capacitor of all stored energy. Management of the above discussed parameters provide the ability to depletion of energy stored in the reservoir capacitor.

As mentioned, the draining of the battery can be a continuous drain of the battery. When the capacitor is full, the battery drain will reduce. The capacitor will most likely leak so the current drain from the battery will continue. One method to extend battery life may be to extend the time interval 303 so as to utilise the energy of the capacitor for a period of time after it has reached its maximum capacity. In any event, at the end of the transmitting step the reservoir capacitor is not depleted.

The transmission of a series of data packets can be received by a remote receiver (not shown). The remote receiver can process the sensor data derived from the data packets. Depending upon the configuration sensor circuit, and in particular, the available continuous current drain rating of a particular battery, the transmission of the data packets can have a sufficient distance value to be received by a particular remote receiver.

The circuits and methods for continuous current drain of a battery for wireless sensor data transmission, including continuously draining current from the battery to the reservoir capacitor to store energy in the reservoir capacitor, generating a series of data packets including sensor data at particular time intervals, transmitting the series of data packets with the stored energy of the reservoir capacitor, and wherein the transmitting step does not drain the reservoir capacitor of all stored energy can provide for a long battery life, particularly in combination with other circuit components that can operate with passive current drain.

The circuits and methods described herein are particularly useful for relatively low data rate transmission, such as at a rate of 5000 baud, which may be sufficient for sensor data transmission. The transmission may be over an unlicensed radio band where the transmission may have a range up to 5 km. A particular advantage arises when using batteries that generally reach their maximum lifetime before they run out of power. Those batteries are typically able hold sufficient energy for the desired sensor transmission but may not be able to provide sufficient current to power the transmission circuit. In this case, the proposed circuits and methods allow the use of those batteries as the energy is stored intermediately in a form that allows for sufficiently high current during transmission. For example, the battery may last up to 10 years while periodically transmitting sensor data using the circuits and methods described herein.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiments were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of a circuit including a sensor/MCU circuit component, a battery, a current limiting component, a transmitter and a reservoir capacitor, the sensor/MCU circuit component being configured to generate sensor data, comprising:
    passively draining current from the battery via the current limiting component to the reservoir capacitor to store energy in the reservoir capacitor so that during the operation of the circuit, the transmitter utilises energy from the reservoir capacitor; and
    generating a signal including a series of data packets including sensor data at particular time intervals wherein the sensor/MCU circuit component simultaneously passively drains current from the battery so that during operation of the circuit, the passive drain of the battery is the only source of energy to the sensor/MCU circuit component; and
    transmitting the series of data packets with the stored energy of the reservoir capacitor, and wherein the series of data packets is configured so that the transmitting step does not drain the reservoir capacitor of all stored energy.

2. The method of claim 1 wherein the time intervals between the series of data packets is at least substantially the same as the minimum amount of time required to recharge the reservoir capacitor after the reservoir capacitor has been partially depleted.

3. The method of claim 1 wherein the number of data packets and their length are limited to avoid depletion of the energy stored in the reservoir capacitor during the transmitting step.

4. The method of claim 1 further comprising a remote receiver for receiving the sensor data, the receiver configured to process the sensor data.

5. The method of claim 1,
    wherein the time intervals between the series of data packets is at least substantially the same as the minimum amount of time required to recharge the reservoir capacitor after the reservoir capacitor has been partially depleted.

6. The method of claim 5 wherein the number of data packets and their length of the data packets is limited to avoid depletion of the power stored in the reservoir capacitor during the transmitting step.

7. The method of claim 5 wherein the transmitting step does not drain the reservoir capacitor of all stored energy.

8. The method of claim 5 further comprising a remote receiver for receiving the sensor data, the receiver configured to process the sensor data.

9. The method of claim 1,
    wherein the number of data packets is limited to avoid depletion of the energy stored in the reservoir capacitor during the transmitting step.

10. The method of claim 9 wherein the length of the data packets is limited.

11. The method of claim 9 wherein the time interval between in the series of data packets is at least substantially the same as the minimum amount of time required to recharge the reservoir capacitor after the reservoir capacitor has been partially depleted.

12. The method of claim 9 wherein the transmitting step does not drain the reservoir of all stored energy.

13. The method of claim 9 further comprising a remote receiver for receiving the sensor data, the receiver configured to process the sensor data.

14. The method of claim 1,
    wherein the length of data packets is limited to avoid depletion of the energy stored in the reservoir capacitor during the transmitting step.

15. The method of claim 14 wherein the time interval between in the series of data packets is at least substantially the same as the minimum amount of time required to recharge the reservoir capacitor after the reservoir capacitor has been partially depleted.

16. The method of claim 14 wherein the transmitting step does not drain the reservoir of all stored energy.

17. The method of claim 14 further comprising a remote receiver for receiving the sensor data, the receiver configured to process the sensor data.

18. A circuit including a sensor/MCU circuit component, a battery, a current limiting component, a transmitter and a reservoir capacitor, the sensor/MCU circuit component being configured to generate sensor data comprising:
    a first circuit component for passively draining current from the battery via the current limiting component to the reservoir capacitor to store energy in the reservoir capacitor so that during the operation of the circuit, the transmitter utilizes energy from the reservoir capacitor; and
    a second circuit component for generating a signal including a series of data packets including sensor data at particular time intervals wherein the sensor/MCU circuit component simultaneously passively drains current from the battery so that during operation of the circuit, the passive drain of the battery is the only source of energy to the sensor/MCU circuit component; and a third circuit component for transmitting the series of data packets with the stored energy of the reservoir capacitor, and wherein the series of data packets is configured so that the transmitting does not drain the reservoir capacitor of all stored energy.

19. The circuit of claim 18 wherein the current limiting component comprises a resistor or current limiting diode.

20. The circuit of claim 18 wherein the time intervals between the series of data packets is at least substantially the same as the minimum amount of time required to recharge the reservoir capacitor after the reservoir capacitor has been partially depleted.

21. The circuit of claim 18 wherein the number of data packets and their length is limited to avoid depletion of the energy stored in the reservoir capacitor during the transmitting step.

22. The circuit of claim 18 wherein the circuit is part of a system, the system further comprising a remote receiver for receiving the sensor data, the receiver configured to process the sensor data.

\* \* \* \* \*